Nov. 25, 1952  L. STANTON  2,619,514
CAPACITY-REBALANCING TYPE MEASURING APPARATUS
Filed Feb. 18, 1950
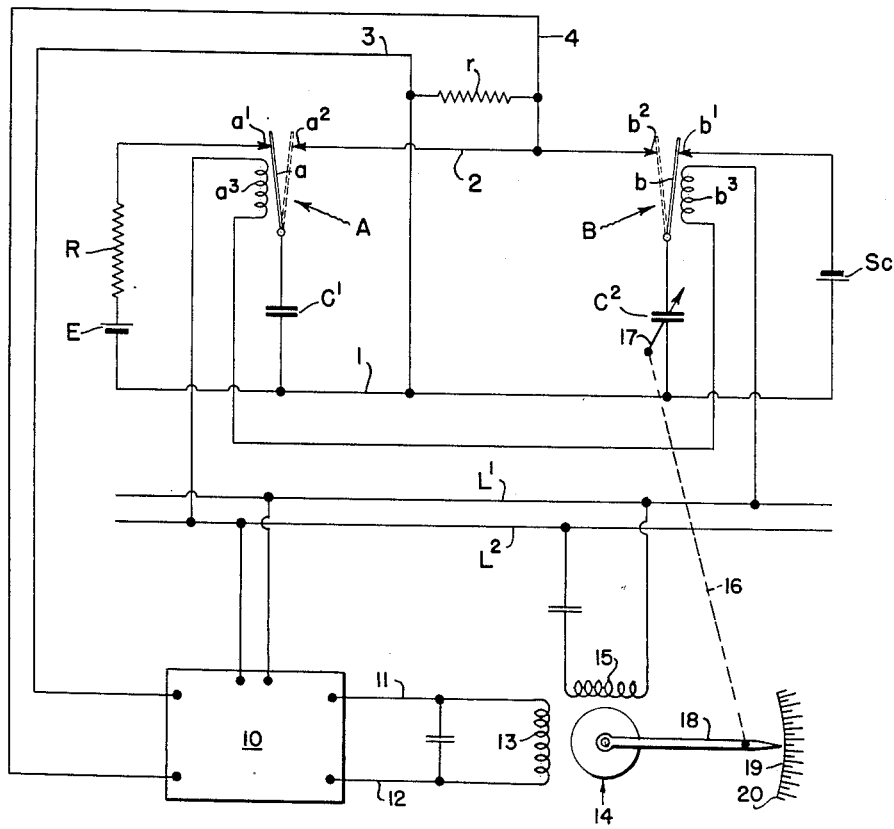
INVENTOR.
LEONARD STANTON
BY
Arthur H. Swanson
ATTORNEY.

Patented Nov. 25, 1952

2,619,514

UNITED STATES PATENT OFFICE 2,619,514

CAPACITY-REBALANCING TYPE MEASURING APPARATUS

Leonard Stanton, Philadelphia, Pa., assignor to Minneapolis-Honeywell Regulator Company, Minneapolis, Minn., a corporation of Delaware Application February 18, 1950, Serial No. 145,042

4 Claims. (Cl. 171—95)

The present invention relates to measuring apparatus of the capacity-rebalancing type, adapted for use in measuring thermocouple and other small unidirectional voltages. In such apparatus, the source of variable, unknown voltage to be measured is intermittently connected to and charges a first condenser, which is ordinarily a fixed condenser. A second condenser, which is ordinarily a variable condenser and serves as a comparison or measuring condenser, is intermittently connected to and charged by a source of constant reference voltage. Ordinarily, the latter is a standard cell. Each charge put on the first condenser by the variable voltage source is compared with the charge put on the second condenser by the standard voltage source. When the condenser charges compared are unequal, an out-of-balance signal is produced, and the latter is customarily used to control the operation of a motor which then operates to adjust the variable comparison condenser in the direction and to the extent required to equalize the charges on the two condensers, provided no change in the voltage of the unknown voltage source has occurred in the meantime. The rebalancing motor and its control means employed may take various forms, and, in particular, may well be of the widely used form disclosed and claimed in the Wills Patent 2,423,540, of July 8, 1947.

In the operation of prior capacity-rebalancing apparatus of the type heretofore customary, the source of voltage to be measured and the standard cell or other constant voltage source are each connected into and are disconnected from a measuring or detector circuit in rapid alternation, the frequency of alternation usually being 60 cycles per second. When the apparatus is in its balanced condition, the product of the voltage to be measured and the capacity of the first condenser is equal to the product of the standard comparison voltage and the capacity of the second or comparison condenser. When the apparatus is unbalanced, said products are unequal, in which case a suitable adjustment of the capacity of the comparison or rebalancing condenser makes the two products equal and thus rebalances the apparatus. In the balanced condition of the apparatus, the corresponding position of the adjustable comparison or rebalancing capacitor provides a measure of the unknown voltage to be measured.

In the practical use of apparatus of the capacity-rebalancing type developed prior to my present invention, it has been found necessary to limit the maximum unknown voltage source resistance to about 25,000 ohms. That limit is a result of the prior art practice of charging the condensers during the measurement intervals. With that practice, when the source resistance is large, an unsatisfactory balance signal is obtained, due to the exponential character of the condenser charging current.

The general object of the present invention is to provide apparatus of the capacity-rebalancing type in which the unknown voltage source resistance may be many times as great as is permissible with prior capacity-rebalancing apparatus. More specifically, the object of my invention is to provide a simple and effective capacity-rebalancing circuit arrangement in which the condensers are charged during periods separate from those in which the measuring or comparison operations are effected. With my invention, the resistance of the unknown voltage source to be measured may be as high as, or even higher than, one megohm. The upper limit of that resistance is not determined by the balance signal, which is independent of the source resistance, but by the fact that the measurement span becomes dependent on the magnitude of the source resistance. If that resistance is not greater than one megohm, however, the effect of the span dependence on the source resistance is not significant in apparatus in which inaccuracies of the order of one-quarter of one per cent are tolerable.

A more specific object of the present invention is to provide a capacity-rebalancing apparatus network which is of a desirably simple character and which is characterized by its provisions for connecting the source of voltage to be measured across the terminals of the fixed condenser during charging periods in which the constant source of voltage is connected across the terminals of the variable comparison condenser, and for disconnecting the two condensers from the associated voltage sources during measuring periods alternating with the charging periods. During the measuring periods, the two condensers are connected in series with one another in a measuring circuit which does not include either voltage source and in which each condenser tends to discharge into the other.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

The single figure of the drawing is a circuit diagram illustrating a preferred form of the present invention.

The embodiment of the invention illustrated by way of example in the drawing comprises a circuit network including an unknown source of voltage E and a constant voltage source or standard cell Sc. A conductor 1 connects one terminal of the unknown voltage source E to one terminal of the standard cell Sc. In the apparatus shown in the drawing, the conductor 1 connects the negative terminal of the source E to the positive terminal of the standard cell Sc, but the apparatus shown would operate equally well if the conductor 1 connected the positive terminal of voltage source E to the negative terminal of the standard cell Sc.

Said circuit network also includes a fixed condenser $C'$ having one terminal connected to the conductor 1 and having a second terminal connected to the vibrating contact $a$ of a vibrator unit A associated with the voltage source E and the condenser $C'$. The network further includes a variable comparison or rebalancing condenser $C^2$ having one terminal connected to the conductor 1 and having a second terminal connected to the vibrating contact $b$ of a vibrator unit B associated with the standard cell Sc and the condenser $C^2$. The contact $a$ vibrates back and forth between a position, shown in the drawing in full lines, in which it engages a contact $a'$ connected to the positive terminal of the source E, and a second position, shown in dotted lines, in which it engages a stationary contact $a^2$ connected to one end of a conductor 2. The contact $b$ vibrates back and forth between a full line position, in which it engages a stationary contact $b'$ connected to the negative terminal of the cell Sc, and a second position, shown in dotted lines, in which it engages a stationary contact $b^2$ connected to the conductor 2.

As shown, the vibrator unit A includes an operating coil $a^3$, while the vibrator unit B includes an operating coil $b^3$. The two coils $a^3$ and $b^3$ are connected in series across supply conductors $L'$ and $L^2$ adapted to supply alternating current of suitable frequency, such, for example, as 60 cycles per second. Advantageously, the vibrator contacts $a$ and $b$ are polarized so that the frequency of vibration of each is the same as the frequency of the alternating current supplied by the conductors $L'$ and $L^2$.

In accordance with the present invention, the vibrator units A and B are so arranged and connected between the supply conductors $L'$ and $L^2$ that the contact $a$ engages the contact $a'$ and connects the voltage source E in series with the condenser $C'$ during the same half cycles of the alternating current supplied by conductors $L'$ and $L^2$ in which the vibrator contact $b$ engages the contact $b'$ and connects the standard cell Sc in series with the variable condenser $C^2$. During the alternate half cycles of the alternating current, the contacts $a$ and $b$ engage the contacts $a^2$ and $b^2$, respectively, and thus connect the two condensers $C'$ and $C^2$ in series with one another, so that each condenser may then discharge into the other. In the balanced condition of the apparatus, the voltage between the conductors 1 and 2 is substantially zero.

During each condenser discharging period following a charging period in which the charge put on the condenser $C'$ has exceeded or was less than the charge put on the condenser $C^2$, the potential acquired by the conductor 2 will respectively exceed or fall below the potential then acquired by the conductor 1. The difference, if any, between the potentials of the conductors 1 and 2 during each condenser discharging period is transmitted to an electronic detector by output conductors 3 and 4 which are respectively connected to the conductors 1 and 2. The electronic detector employed may be of any of various known types heretofore used in capacity-rebalancing apparatus, or it may be of any suitable available type. The detector arrangement diagrammatically illustrated by way of example comprises an impedance $r$ connected between the output terminals 3 and 4 and comprises an electronic amplifier 10 to which the terminals 3 and 4 are connected. The amplifier 10 amplifies the alternating voltage signal which is developed in the impedance $r$ and which has the same frequency as that with which the above described switching means intermittently connects the second terminals of the two condensers $C'$ and $C^2$. Said signal is of one phase or the opposite phase accordingly as the potential of the condenser $C'$ exceeds or is less than the potential of the condenser $C^2$.

The output terminals 11 and 12 of the amplifier 10 are connected to the terminals of the control winding 13 of a reversible alternating current motor 14. The latter has a power winding 15 which is adapted for connection to a source of alternating current of the same frequency as the signal amplified. As shown, the energizing current for the winding 15 is provided by the supply conductors $L'$ and $L^2$. The phase of the current supplied to the power winding 15 leads or lags the reversible phase of the alternating current signal applied to the control winding 13 by the amplifier output terminals 11 and 12. When the winding 13 is operatively energized, the motor 14 rotates in one direction or in the opposite direction accordingly as the current in the winding 13 then leads or lags the current in the winding 15.

As diagrammatically illustrated, the motor 14 operates through a link 16 to turn a condenser adjusting element 17 about its supporting axis. The adjustment of the element 17 is in the direction to increase or decrease the capacity of the condenser $C^2$ as required to make the voltage across that condenser equal to the voltage across the condenser $C'$, thus rebalancing the measuring system and reducing to zero the signal impressed on the amplifier 10 by the output terminals 3 and 4.

As those skilled in the art will recognize, the mechanism through which the motor 14 is actuated in accordance with the magnitude and phase of the signal impressed on the amplifier 10 is of the well-known and widely used type disclosed in said Wills Patent 2,423,540.

As illustrated, an arm 18 fixed to the rotor of the motor 14 is connected by the link 16 to the member 17. When the motor is energized, the arm 18 cooperates with a scale 19 to show the angular displacement of the rotor from an initial position 20. The motor position 20 may correspond to and indicate an assumed minimum value of the voltage of the source E, and a minimum value of the capacity of the variable condenser $C^2$. As the variable voltage of the source E increases above its minimum value the motor rotates in the direction to increase the capacity of the condenser $C^2$ as required to rebalance the apparatus. On a further change in voltage of the source E in either direction, the motor will angularly adjust its arm 18 towards and away from the initial position 20. Thus the angular position of the arm 18 is adjusted along the scale 19 as the voltage of the source E increases and decreases relative to the assumed minimum value of that voltage.

As diagrammatically shown in the drawing, a resistor R is connected in series with the unknown voltage source E between the conductor 1 and the contact $a'$. The resistance represented by the resistor R will ordinarily consist wholly or mainly of the internal resistance of the source of voltage E. That internal resistance may well be less than twenty-five thousand ohms in some cases, but may be much higher in other cases. Heretofore, as previously explained, said resistance of the source E could not exceed twenty-five thousand ohms without producing an unsatisfactory balance signal. With the circuit arrangement shown, however, the resistance of the source E may be as high as one million ohms without preventing practically satisfactory operation.

The operative ability of the apparatus shown diagrammatically in the drawing to give a satisfactory balance signal, when the resistance of the circuit portion between the conductor 1 and contact $a'$ is as high as one megohm or higher, is a direct result of the fact that the charging and measuring or comparing actions occur in separate half cycles of the alternating current energizing the switch mechanism collectively including the vibrating contacts $a$ and $b$ and the stationary contacts $a'$, $b'$, $a^2$ and $b^2$. The invention thus makes available all of each alternate half cycle for use in charging the condenser $C'$. Notwithstanding the exponential character of the condenser charging action and the radical reduction in the charging current produced by high resistance in the charging circuit, the half-cycle period available with a frequency of 60 cycles per second is ample for substantially complete charging of the condenser $C'$, even when said resistance is of the order of one megohm and the charging current is correspondingly small.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Measuring apparatus comprising a circuit network including a source of substantially constant voltage and first and second measuring terminals adapted for connection to the respective terminals of opposite polarity of a relatively high impedance source of variable voltage to be measured, said source of constant voltage having first and second reference terminals of opposite polarity, first and second output terminals, said second measuring terminal and said second reference terminal being of the same polarity, first and second condensers each having first and second terminals, conductor means connecting the first terminals of said first and second condensers to one another and to said first reference terminal and to said second measuring terminal and to said first output terminal, a switch mechanism connected to the second terminals of said condensers and operative to connect intermittently the second terminal of each of said condensers to the second terminal of the other of said condensers and to said second output terminal during measuring periods which alternate with condenser charging periods in which said switch mechanism connects the second terminal of said first condenser to said first measuring terminal and connects the second terminal of said second condenser to said second reference terminal, and detecting means responsive to the difference between the potential between the terminals of said first condenser and the potential between the terminals of said second condenser during said measuring periods and comprising an impedance connected between said output terminals and in which an alternating voltage signal is developed by the action of said switch mechanism when the voltages across said condensers are unequal, said alternating voltage being of one phase or of the opposite phase accordingly as one or the other of the last mentioned voltages is the higher, an electronic amplifier connected to said output terminals and amplifying said signal and having output terminals, a reversible motor having a control winding connected to the amplifier output terminals and having a power winding adapted for connection to a source of alternating current of the frequency with which the second terminals of said condensers are intermittently connected by the switching means, and adjusting connection between said motor and second condenser through which the motor, when operatively energized by the amplifier, varies the capacity of the second condenser in the direction to equalize the potentials across the two condensers.

2. Apparatus as specified in claim 1, wherein said switch mechanism comprises automatic means for repeating the measuring and charging periods at a predetermined frequency low enough to permit the substantially complete charging of said first condenser during each charging period with resistance substantially in excess of 25,000 ohms in the charging circuit including said first condenser and the source of voltage connected to said measuring terminals.

3. Apparatus as specified in claim 2, wherein said predetermined frequency is of the order of 60 cycles per second.

4. Apparatus as specified in claim 1, wherein said switch mechanism comprises automatic means for repeating the measuring and charging periods at a predetermined frequency low enough to permit the substantially complete charging of said first condenser during each charging period with resistance as high as approximately one megohm in the charging circuit including said first condenser and the source of voltage connected between said measuring terminals.

LEONARD STANTON.

REFERENCES CITED

The following references are of record in the file of this patent:

UNITED STATES PATENTS

| Number | Name | Date |
| --- | --- | --- |
| 2,285,482 | Wunsch | June 9, 1942 |